United States Patent [19]

Obermeier et al.

[11] Patent Number: 5,467,835
[45] Date of Patent: Nov. 21, 1995

[54] DRILLING OR CHISELING TOOL WITH SUCTION APPARATUS

[75] Inventors: Josef Obermeier, Peiting; Ulrich Müller-Boysen, Deizisau; Siegfried Keusch, Deizisau; Peter Gaffal, Deizisau, all of Germany

[73] Assignee: Hilti Aktiengesellschaft, Schaan, Liechtenstein

[21] Appl. No.: 324,869

[22] Filed: Oct. 18, 1994

[30] Foreign Application Priority Data

Oct. 18, 1993 [DE] Germany .................... 43 35 417.3

[51] Int. Cl.⁶ .................. B25D 17/14; E21C 7/02
[52] U.S. Cl. ................ 175/209; 55/521; 173/75; 408/67
[58] Field of Search .................. 175/209, 213; 299/37, 64, 67; 55/385.1, 467, 521; 408/67; 173/75, 198

[56] References Cited

U.S. PATENT DOCUMENTS

| 4,192,390 | 3/1980 | Wanner et al. | 173/75 |
| 5,113,951 | 5/1992 | Houben et al. | 408/67 X |
| 5,125,941 | 6/1992 | Ernst et al. | 55/521 X |
| 5,199,501 | 4/1993 | Klüber et al. | 173/75 |

FOREIGN PATENT DOCUMENTS 2940362  4/1981  Germany .................... 408/67

Primary Examiner—David J. Bagnell
Attorney, Agent, or Firm—Anderson Kill Olick & Oshinsky

[57] ABSTRACT

A drilling or chiseling tool includes a suction apparatus (8) releasably mounted on a housing (1) of the tool. The suction apparatus (8) contains a replaceable separating device (11) formed of a housing (13) subdivided into two separate chambers (K1, K2) by a filter element (14) replaceably fitted in the housing. Each chamber (K1, K2) has an aperture (12, 15) and the cross-sections of the apertures extend at right angles to one another.

9 Claims, 3 Drawing Sheets

DRILLING OR CHISELING TOOL WITH SUCTION APPARATUS

BACKGROUND OF THE INVENTION

The present invention is directed to a manually operated drilling or chiseling tool with a suction apparatus equipped with a separating device releasably connected to the tool.

Suction apparatuses are used for withdrawing drill chips and drilled materials generated, when concrete, rock or the like is worked on.

A drilling or chiseling tool with suction apparatus is disclosed in U.S. Pat. No. 4,199,501 where the separating device is a filter bag. Such a filter bag has the disadvantage that the fine porous walls of the bag are rapidly blocked by very fine dust, accordingly, the air flow required for withdrawing the drilled material and circulating through the filter bag encounters resistance with a resulting reduction in the suction capability.

SUMMARY OF THE INVENTION

Therefore, the primary object of the present invention is to provide a drilling or chiseling tool with a suction apparatus incorporating a separating device for assuring unimpaired air flow.

In accordance with the present invention the separating device includes a housing releasably connected to the suction apparatus with a filter element within the housing and dividing it into two separate chambers with a first aperture discharging drilled material into a first chamber and with the cross-section of this first aperture extending substantially at right angles to filtering faces of the filter element.

With the air flow to the first aperture flowing parallel to the filter faces in the separating device, the filtering face surfaces are cleaned, since the drilled material clinging to the surfaces is blown away. Accordingly, the first aperture forms the inlet aperture to the separating device and a second aperture forms the outlet aperture.

Accordingly, the separating device is subdivided into two chambers by the filter element, whereby the drilled material and drilling dust blown away from the extreme face surfaces is collected in the first chamber. The drilled material and drilling dust is collected at the opposite end of the first chamber from the first aperture. The second chamber serves for the free flow of the air flowing through the filtering face surfaces, that is, in the direction of a suction blower wheel forming part of the suction apparatus.

To provide a small sized separating device, the cross-sections of the inlet and outlet apertures preferably extend substantially at right angles to one another. In this way it is possible to bring the apertures of the separating device one following the other in connection with the inlet and outlet channels of the suction apparatus when the separating device is inserted.

The separating device of the invention must be removed from the suction apparatus at specific intervals for cleaning or possibly for replacement with a new separating device. The separating device is arranged for improved handling, so that the first aperture can be closed by a spring-loaded non-return lid. This feature assures an automatic closing of the first aperture as soon as the first aperture is separated from the inlet channel. As a result, drilled material and drilling dust collected in the first chamber cannot escape from the separating device through the first aperture.

Preferably, for economic and fabrication reasons, the filter element is a bellows-type filter. Such a filter has the advantage that certain of the filtering face surfaces are disposed substantially parallel to one another and as a unit form a very large filtering surface. Accordingly, the air flow through the separating device passes more easily through the filter element.

Preferably, for environmental and fabricating reasons, the filter element is formed of paper. In particular, reusable waste paper of poor quality can be used in fabricating the filter element, since there is no other use for such waste paper. The cost of fabricating such a filter element is low due to the very cheap raw material.

Since the weight of the drilled material increases as its collection in the separating device continues, it is particularly important that the filter element is formed as light as possible. For instance, the separating device can be designed in such a way that it is replaceable, so that no longer usable filter elements can be disposed of in a simple and effective manner.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there are illustrated and described preferred embodiments of the invention.

DETAILED DESCRIPTION OF THE INVENTION

Figure 1:
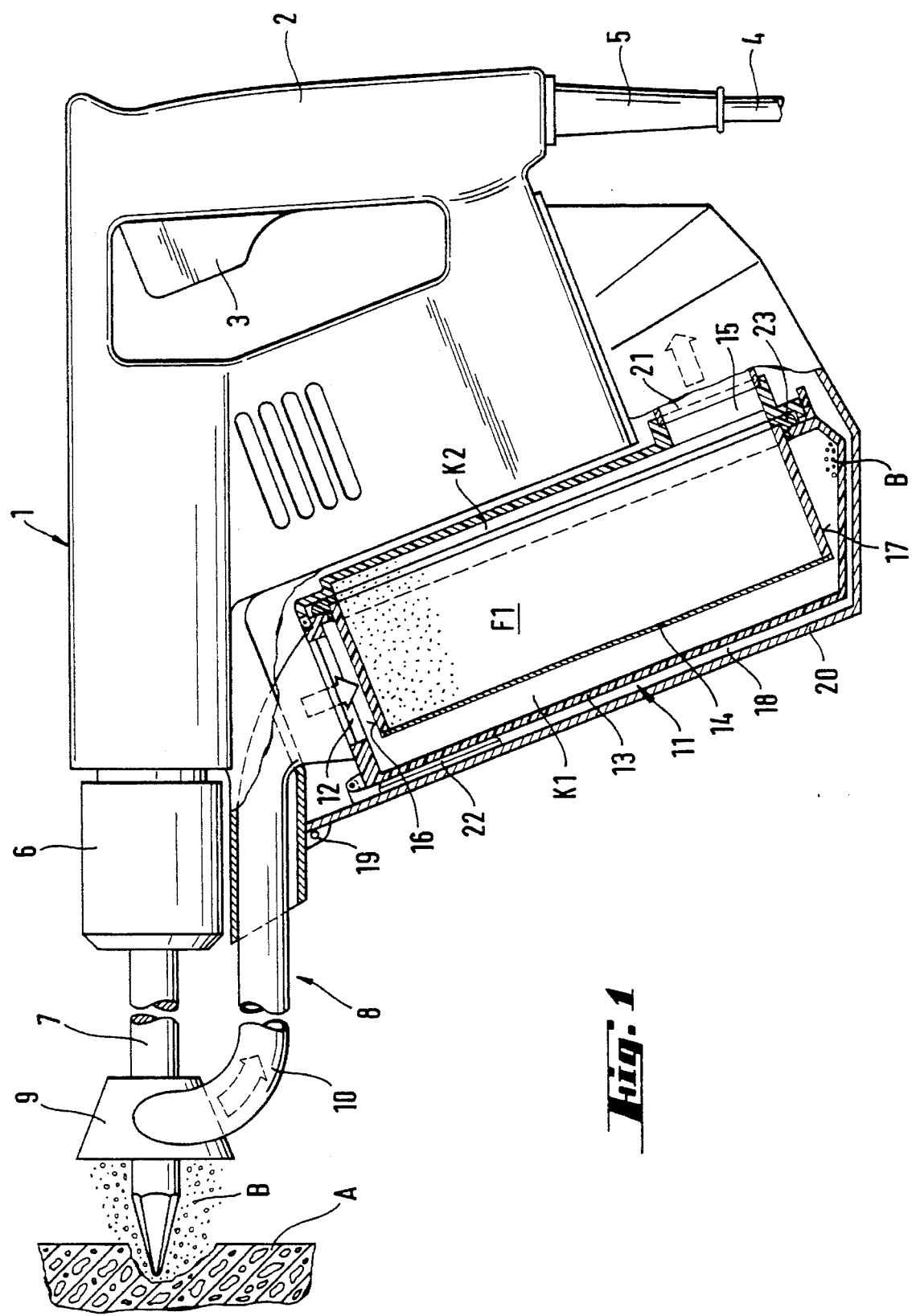
FIG. 1 is a side elevational view of a drilling or chiseling tool incorporating a suction apparatus embodying the presnt invention and with a portion of the suction apparatus shown in section.
Figure 2:
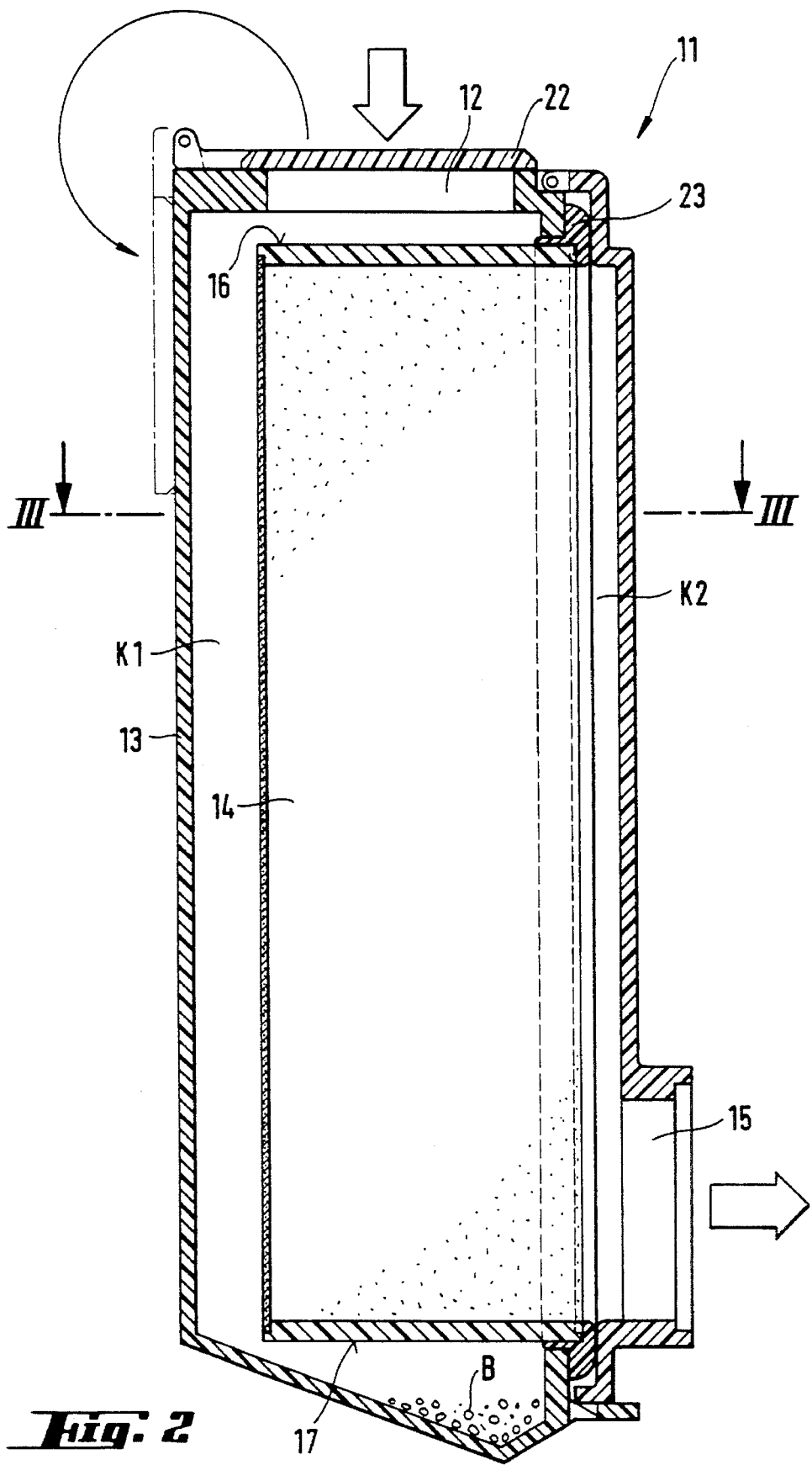
FIG. 2 is a sectional view of a separating device forming a part of the suction apparatus illustrated in FIG. 1.

In FIG. 1 a manually operated drilling or chiselling tool is shown formed by a housing 1 having a front end to the left and a rear end to the right with a handle 2 at the rear end. Handle 2 has a trigger 3 for actuating an installed switch, not shown. The switch places the drilling or chiseling tool in operation. A current supply cable 4 enters the tool through the lower end of the handle 2 where it is protected against mechanical damage by an elastic bush 5. At the front end of the drilling or chiseling tool housing 1, that is the opposite end from the handle 2, a drill chuck 6 is located for holding a drilling or chiseling tool bit 7. A suction apparatus is releasably fitted on the housing 1 of the tool for withdrawing or aspirating drill chips or drilled material B from the region of a substratum or layer A of a structure being worked on. The suction apparatus 8 includes a suction head 9 fitted on the tool bit 7 in the region of the layer A, a suction line 10 connected to the suction head 9 at one end and to a separating device 11 at the other end and a suction blower wheel, not shown, is located downstream of the separating device. The separating device 11 has a spring loaded lid 22 pivotally displaceable between an opened position, as shown in FIG. 1, and a closed position, as shown in FIG. 2. The suction head 9 is located on the tool bit 7 for withdrawing drilled material from the region of the layer A where the tool bit 7 is working. Suction line 10 runs from suction head 9 to a first aperture 12 of the separating device 11.

The drilled material B removed from the surface or layer A during the working operation is withdrawn or aspirated along with drilling dust by the suction apparatus 8. The suction blower wheel, not shown, is located downstream of the separating device 11 and generates an air flow withdrawing the drilled material A as well as the drilling dust at high speed from the working area through the suction head 9 and the suction line 10 into the separating device 11.

Figure 3:
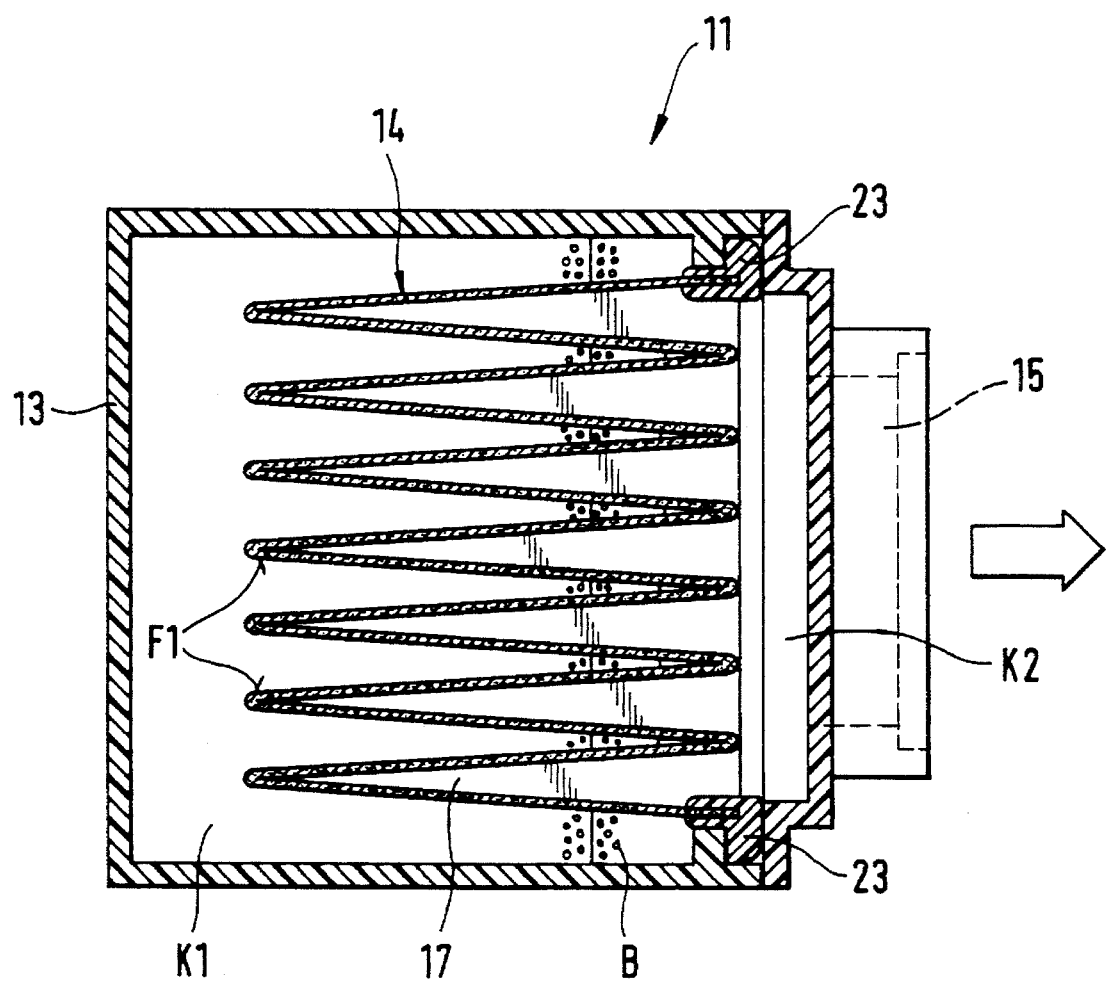
FIG. 3 is a sectional view through the separating device taken along line III—III in FIG. 2.

The separating device 11 illustrated in FIGS. 2 and 3 is made up of a housing 13 containing a bellows-like filter element 14 within the housing. The filtering element is elongated in the direction of the flow into the housing 13. Filter element 14 divides the volume of the housing into two separate chambers K1, K2. The first aperture 12, as viewed in FIG. 2, is located at the upper end of the housing 13 and the first aperture opens into the chamber K1 which acts as an inlet chamber. A second aperture 15 is located at the lower end of the housing 13 and opens from the second chamber K2. The cross-sections of the first and second apertures 12, 15 are arranged substantially at right angles to one another. The first aperture 12 can be closed by the spring loaded lid 22 when the separating device 11 is located outside the suction apparatus 8.

The filter element 14 extends in the long direction of the housing 13 from adjacent the upper end of the housing to adjacent its lower end. The drilled material B enters the first chamber K1 through the first aperture 12 and is collected in the lower end of the first chamber K1. The second chamber K2 serves for the unhindered outflow of the air passing from the first chamber K1 through the filter element 14 into the second chamber K2 and then flowing out through the second aperture 15 in the direction of the suction blower wheel, not shown.

The filter element 14 is shaped as a bellows-type filter, as shown best in FIG. 3, and is located in the housing 13 of the separating device so that the air flowing through the inlet or first aperture 12 enters the first chamber K1 flowing in the elongated direction of the housing and over the elongated first filter surfaces F1. As a result, drilling dust clinging to the first filter surfaces or faces F1 is blown away so that during the suctioning operation, cleaning of the first filtering surfaces F1 of the filter element 14 occurs simultaneously.

As can be seen in FIG. 2, the filter element 14 is closed at its upper end by a plate 16 and at the lower end by a plate 17 so that the air entering through the first aperture 12 can flow directly into the second chamber K2 flowing through the filter element 14.

Sealing elements 23 are arranged between the filter element 14 and the housing 13 affording a seal between the first and second chambers K1, K2 so that the air containing the drilled material cannot bypass the filter element 14.

The separating device 11 is housed in a cavity 18, note FIG. 1, of the suction apparatus 8 provided especially for the device. A lid 20 of the suction apparatus 8 can be pivoted to an open position about the hinge 19 so that the interior of the cavity is accessible.

The filter element 14 is arranged in the separating device 11 of the suction apparatus 8 so that it can be replaced.

The second aperture 15 is connected to an outlet or diversion channel 21 leading to the suction blower wheel, not shown.

While specific embodiments of the invention have been shown and described in detail to illustrate the inventive principles, it will be understood that the invention may be embodied otherwise without departing from such principles.

We claim

1. Manually operated drilling and chiseling tool comprises a suction apparatus (8) including a separating device (11) releasably mounted on the tool, wherein the improvement comprises that the separating device (11) comprises a filter element (14) and a housing (13) which is releasably connected with the suction apparatus (8), that the housing (13) is mounted in the suction apparatus (8), the filter element (14) is located within and divides the housing (13) into a first inlet chamber (K1) and a second outlet chamber (K2), said housing (13) includes a first aperture (12) having a first cross-section opening into said first chamber (K1) and a second aperture (15) having a second cross-section and opening from said second chamber (K2), and said filter element (14) having filtering face surfaces elongated in a first direction and said first direction extending substantially at right angles to the first cross-section of said first aperture (12).

2. Manually operated drilling and chiseling tool, as set forth in claim 1, wherein said first cross-section of said first aperture (12) and said second cross-section of said second aperture (15) extend substantially at right angles to one another.

3. Manually operated drilling and chiseling tool, as set forth in claims 1 or 2, wherein said separating device (11) includes a spring loaded lid (22) for closing said first aperture (12).

4. Manually operated drilling and chiseling tool, as set forth in claims 1 or 2, wherein said filter element (14) is a bellows-shaped filter.

5. Manually operated drilling and chiseling tool, as set forth in claim 4, wherein said filter element is formed of paper.

6. Manually operated drilling and chiseling tool, as set forth in claim 4, wherein said filter element extends between a first plate (16) adjacent said first aperture and a second plate (17) adjacent said second aperture whereby air flowing through said first aperture passes through said filter and cannot bypass said filter.

7. Manually operated drilling and chiseling tool, as set forth in claim 6, wherein sealing means (23) are located within said housing (13) for sealing said filter element (14) therein and preventing air entering said first aperture (12) from bypassing said filter element (14) and exiting from said second aperture (15).

8. Manually operated drilling and chiseling tool, as set forth in claim 2, wherein said separating device (11) comprises a pivotally mounted lid (20) pivotally displaceable for affording access to said housing (13) whereby said housing is removable from said separating device (11), and said housing (13) including a spring loaded lid (22) for closing said first aperture (12) when said housing (13) including said filter element (14) is removed from said separating device (11).

9. Manually operated drilling and chiseling tool, as set forth in claim 7, wherein said housing (13) has a first end containing said first aperture (12) and a second end spaced more remotely from said first end than the second end of said filter element, and said second end of said housing (13) forming a collection chamber for drilled material at an opposite end of said filter element (14) from said first aperture (12).

\* \* \* \* \*